United States Patent
Sanders et al.

(10) Patent No.: US 8,132,628 B2
(45) Date of Patent: Mar. 13, 2012

(54) METHODS FOR INCREASING OIL PRODUCTION

(76) Inventors: James Kenneth Sanders, Lubbock, TX (US); Duck Joo Yang, Flower Mound, TX (US)

( * ) Notice: Subject to any disclaimer, the term of this patent is extended or adjusted under 35 U.S.C. 154(b) by 270 days.

(21) Appl. No.: 12/622,590

(22) Filed: Nov. 20, 2009

(65) Prior Publication Data

US 2010/0126737 A1     May 27, 2010

Related U.S. Application Data

(63) Continuation-in-part of application No. 12/275,719, filed on Nov. 21, 2008.

(51) Int. Cl.
*E21B 43/248* (2006.01)
*E21B 43/263* (2006.01)

(52) U.S. Cl. ........................................ 166/400; 166/262

(58) Field of Classification Search .................. None
See application file for complete search history.

(56) References Cited

U.S. PATENT DOCUMENTS

| | | | |
|---|---|---|---|
| 3,811,504 A | 5/1974 | Flournoy et al. | |
| 3,811,505 A | 5/1974 | Flournoy et al. | |
| 3,902,556 A | 9/1975 | Tate | |
| 3,921,718 A | 11/1975 | Tate et al. | |
| 4,366,864 A | 1/1983 | Gibson et al. | |
| 4,895,206 A | 1/1990 | Price | |
| 6,227,293 B1 * | 5/2001 | Huffman et al. | 166/248 |
| 7,976,684 B2 | 7/2011 | Ferrer | |

OTHER PUBLICATIONS

International Preliminary Report for PCT/US2009/065272 mailed on May 24, 2011.
Written Opinion for PCT/US2009/065272 mailed on issued on May 24, 2011.
International Search Report for PCT/US2009/065272 mailed on Jan. 26, 2010.
Written Opinion for PCT/US2009/065272 mailed on Jan. 26, 2010.

* cited by examiner

*Primary Examiner* — Angela M DiTrani
(74) *Attorney, Agent, or Firm* — Turocy & Watson, LLP

(57) ABSTRACT

A method of recovering petroleum from dormant oil wells or increasing the production of oil wells. An alkali or alkali earth carbonate is introduced into a water layer associated with a subterranean petroleum reservoir and/or an explosive composition is introduced into an oil layer associated with a subterranean petroleum reservoir. $CO_2$ gas is produced by reacting the alkali or alkali earth carbonate with an acid and/or by detonating the explosive composition. An explosive composition can be introduced and detonated to achieve sufficient $CO_2$ gas production to increase pressure within the subterranean petroleum reservoir.

21 Claims, 4 Drawing Sheets

METHODS FOR INCREASING OIL PRODUCTION

CROSS-REFERENCE TO RELATED APPLICATIONS

This application is a Continuation-In-Part of and claims priority to U.S. application Ser. No. 12/275,719 filed on Nov. 21, 2008, which is incorporated herein by reference.

TECHNICAL FIELD

This disclosure relates to revitalization of dormant oil wells and increased petroleum productions of oil wells by artificial pressurization.

BACKGROUND

Oil wells are formed from boreholes drilled into a porous, subterranean rock formation containing petroleum. These porous, subterranean rock formations are referred to as petroleum reservoirs or oil reservoirs. Often, a petroleum reservoir is located beneath a less permeable rock layer that traps the reservoir under pressure. In reservoirs under newly developed production, pressure naturally present within the reservoir provides force to allow for the migration of petroleum from the petroleum bearing rock into the borehole forming the oil well. As an oil well produces, pressure subsides until a point is reached where production is no longer economically sustainable, and the oil well is typically abandoned.

An abandoned oil well can potentially contain over half of the original amount of oil in the reservoir; however, a lack of pressure in the reservoir makes continued operation of the oil well economically unproductive without further intervention. Several secondary and tertiary recovery methods have been used to recover additional oil. One method is to inject water or a gas (such as $CO_2$ or nitrogen) into the reservoir to create additional pressure. Polymers and surfactants have also been employed to lower the viscosity of petroleum remaining in the reservoir and aid in petroleum flow. However, such methods are typically costly or potentially impractical in cases where materials are expensive and/or large amounts of water are not locally available.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The compositions and methods disclosed herein provide for a low-cost recovery of additional petroleum from sleeping wells as well as enhanced the petroleum production from active wells in an economically efficient manner. Pressure in the form of $CO_2$ gas is generated by detonating an explosive and by reacting a carbonate or bicarbonate compound with an acid. The acid, typically in the form of a mineral acid, also serves to acidify a water layer or aquifer associated with the petroleum reservoir. The solubility of $CO_2$ gas in water is reduced at low pH. Therefore, acidification of any water present in the vicinity of the petroleum reservoir allows a greater fraction of generated $CO_2$ gas to contribute to pressurizing the petroleum reservoir rather than unproductively dissolving into water. A wide range of explosives can be used to practice the methods disclosed herein. The explosive can be a solid, liquid, gel, or a slurry, although free flowing explosives will assist in the introduction of the explosive into the petroleum reservoir. Typical explosive compositions employed in the invention are formed from separate fuel and oxidizer mixed together. The explosive can be carbon rich as to maximize $CO_2$ production and minimize water production during combustion.

One aspect is directed toward methods to increase petroleum production from an oil well drilled into a petroleum reservoir having an oil layer and an aqueous layer. One or more of an alkali carbonate or an alkali earth carbonate is delivered into the water layer through an injection well drilled into the water layer. All wells drilled into the reservoir are sealed in a manner to substantially confine pressure build-up within the reservoir. An acid is delivered through an injection well drilled into the aqueous layer to react with the alkali carbonate or alkali earth carbonate to generate $CO_2$ gas.

Another aspect is directed toward use of an explosive composition to increase $CO_2$ pressure within a petroleum reservoir. An explosive composition is delivered into the oil layer through an injection well or production well drilled into the oil layer. An acid is delivered through an injection well drilled into the water layer to acidify the water and reduce solubility of $CO_2$. The explosive is detonated to generate $CO_2$ gas and heat.

Yet another aspect is direct toward methods to increase petroleum production by using particles of an alkali carbonate or an alkali earth carbonate have an average diameter less than about 100 μm as the alkali carbonate or an alkali earth carbonate delivered to the water layer or as additional source of $CO_2$ gas included in the explosive composition.

Still another aspect is directed toward increasing petroleum production by creating $CO_2$ pressure within a subterranean petroleum reservoir combined with one or supplemental techniques to reduce petroleum viscosity including sonication and microwave radiation.

DETAILED DESCRIPTION

Figure 1:
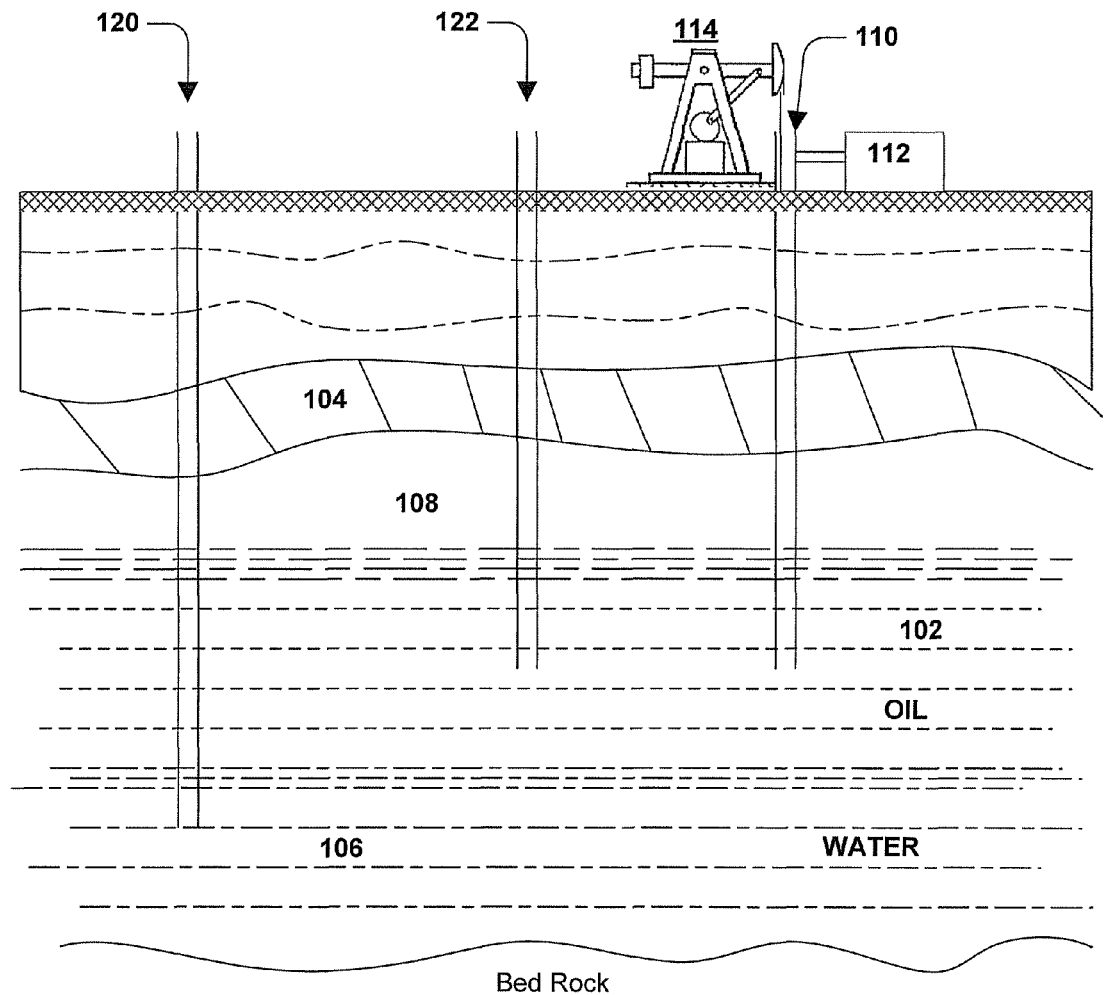
FIG. 1 is a representation of a subterranean petroleum reservoir with wells placed therein in accordance with aspects of the invention.

Petroleum deposits are typically located in subterranean, porous rock formations wherein the porous rock is overlaid with a less porous rock formation preventing the escape of petroleum to the surface. The layer of less porous rock is often referred to as cap rock. In addition to preventing the escape of petroleum, the cap rock also prevents gases produced from the transformation of organic matter into petroleum. As such, untapped, virgin petroleum deposits are often under considerable pressure.

The pressure present in untapped petroleum deposits assists in the efficient extraction of petroleum from deposits. An oil well typically consists of a jacketed borehole drilled through the cap rock and into the petroleum bearing rock. Perforations are formed in the jacket and the natural pressure within the petroleum bearing rock causes the migration of petroleum into the borehole. The pressure within the petroleum deposit can be sufficient to create an oil gusher. Large blowout preventers are often required to prevent overpressure from the petroleum reservoir from damaging sensitive equipment. As the petroleum deposit produces, pressure naturally decreases as petroleum is removed from the deposit. Often, high pressure is initially maintained due to the elution of gasses from liquid petroleum or pressure from water layers or aquifers located underneath many petroleum deposits. In all situations, the rate of petroleum production from a well slows over time.

The rate of production necessary for continued economical operation is a function of operation costs, taxes and/or royalties, and oil commodity price. Abandonment of a well is the economically preferable course of action when the amount of money made from oil production is below the associated costs (operation costs and taxes). As oil production slows, it is possible to attempt to increase production through the use of various secondary and tertiary techniques to increase production rate; however, all such techniques also increase operation costs. Secondary and tertiary techniques are aimed at either increasing pressure within the petroleum deposit to increase production rate or to decrease the viscosity of petroleum remaining within the deposit. Injection of water and/or gas, polymers, and thermally enhanced recovery methods are examples of common, but often costly, techniques.

The innovations disclosed herein are directed toward the efficient production of $CO_2$ within a petroleum deposit to revive an abandoned well or to increase production of an existing well. $CO_2$ pressure is introduced into a petroleum deposit by means of an explosive engineered to produce a maximum release of $CO_2$ within a sealed oil well. Fuel for the explosive can be provided by materials located on-site at a petroleum production operation, such as unrefined crude oil, tar, and paraffin waxes, which may be more efficiently employed to increase production rate than the value obtained for such materials on the market. That is, the value of increased petroleum production exceeds the price of such materials on the open market, thereby, allowing oil production to be increased with minimal associated cost.

The methods disclosed herein are directed toward artificial production of $CO_2$ within a subterranean petroleum reservoir. One aspect is directed toward generation of $CO_2$ gas by addition of an alkali or alkali earth carbonate compound and a mineral acid to a water layer or aquifer associated with the subterranean petroleum reservoir and reacting the alkali or alkali earth carbonate with an acid. Another aspect is directed toward generation by acidification of a water layer or aquifer associated with the subterranean petroleum reservoir and adding an explosive composition containing an alkali or alkali earth carbonate followed by detonation of the explosive composition. Another aspect is directed toward increasing petroleum production by creating $CO_2$ pressure within a subterranean petroleum reservoir combined with one or supplemental techniques to reduce petroleum viscosity including sonication and microwave radiation.

Due to the need to generate pressure, the size of the reservoir is preferably not an overly vast size. In one embodiment, the volume within the porous rock of the petroleum reservoir is less than about 10 $km^3$. In another embodiment, the volume within the porous rock of the petroleum reservoir is less than about 10 $km^3$. In yet another embodiment, the volume within the porous rock of the petroleum reservoir is less than about 1 $km^3$.

Formation of Explosive Composition

The explosive compositions useful in practicing the invention contain at least the two following components: a fuel source and an oxidizer. In another embodiment, the explosive composition contains a fuel source, an oxidizer, and an emulsifying agent. In yet another embodiment, the explosive composition contains a fuel source, an oxidizer, an emulsifying agent and an alkali or alkali earth carbonate compound.

In one embodiment, the fuel source can be selected from one or more of carbon powder, unrefined crude oil, unrefined crude oil originating from the oil well to be revitalized, tar derived from crude oil, refined diesel fuel, lubricating oil, heavy gas oil, and paraffin waxes. Other fuel sources can also be used provided that sufficient combustion occurs. In another embodiment, the fuel source is a carbon powder or a "hydrocarbon-based" compound, or a mixture thereof, wherein the term "carbon powder" refers to amorphous carbon and/or graphite and the term "hydrocarbon-based" refers to compounds formed from primarily carbon and hydrogen. In one embodiment of a hydrocarbon-based compound, the compound contains no hetero atoms (atoms other than carbon and hydrogen) and can contain alkane, alkene, alkyne, cyclic, or aromatic functionalities. In one embodiment, the carbon powder has an average particle size diameter from about 20 nm to about 1 mm. In another embodiment, the carbon powder has an average particle size diameter from about 1 μm to about 500 μm. In yet another embodiment, the carbon powder has an average particle size diameter from about 50 μm to about 300 μm. In another embodiment, the hydrocarbon-based compound contains no more than about three hetero atoms per 10 carbon atoms. In yet another embodiment, the hydrocarbon-based compound contains no more than about one hetero atom per 10 carbon atoms.

The oxidizer component of the explosive can be an inorganic or an organic nitrate, chlorate or perchlorate. In one embodiment, the oxidizer component is ammonium nitrate. In other embodiment, the oxidizer component is selected from one or more of ammonium nitrate, potassium nitrate, hydroxylammonium nitrate, sodium nitrate, calcium nitrate, ammonium chlorate, sodium perchlorate, ammonium perchlorate and like nitrate, chlorate and perchlorate compounds. In one embodiment, the oxidizer component is supplied in the form of prills.

In one embodiment, the fuel and oxidizer components can be simply mixed together thoroughly to form the explosive composition. However, the explosive can take the form of a liquid, solid, gel, emulsion or mixture thereof. A free flowing explosive composition facilitates introduction of the explosive into a target subterranean oil reservoir. Formation of a free flowing explosive composition is facilitated by the formation of separate organic/oil phase comprised of the energetic fuel source and a phase comprising the oxidizer, through use of an emulsifying agent. The oxidizer phase can either be aqueous (water-in-oil emulsion) or formed from a water-free molten phase (melt-in-oil emulsion).

Typically, an emulsion is formed by adding an emulsifying agent to the fuel component/phase and mixing until homogeneity. Then, the fuel plus emulsifying agent is added to the oxidizer phase and mixed to homogeneity. In one embodiment, an alkali or alkali earth carbonate is added to the emulsion formed from fuel, oxidizer, and emulsifying agent and mixed until bulk homogeneity is achieved. Any additional components including metallic oxidizers and corrosion resistance compounds are added to the emulsion containing fuel, oxidizer, and emulsifying agent. In a typical emulsion, the fuel phase forms a continuous phase in the emulsion while the oxidizer and/or aqueous phase forms a discontinuous phase separated from the continuous phase by the emulsifying agent. That is, the emulsifying agent forms micro- or nano-sized micelles having an interior containing the oxidizer and/or aqueous phase. In one embodiment, the micelles have an average diameter from about 100 nm to about 1 μm. In another embodiment, the micelles have a diameter from about 1 μm to about 100 μm. The small size of the micelles allows for transport of the micelles into microporous channels within the petroleum reservoir.

Emulsifying agents are amphiphilic compounds having one portion of the compound being predominately hydrocarbyl in character and another portion of the compound being hydrophilic in nature. Useful emulsifying compounds include a wide range of amphiphilic compounds including: salts of carboxylic acids; products of acylation reactions between carboxylic acids or carboxylic anhydrides and amines; and alkyl, acyl and amide derivatives of saccharides (alkyl-saccharide emulsifiers). Salts of carboxylic acids can be produced from reacting a largely hydrophobic compound, containing at least one carboxylic acid functionality, with an alkali hydroxide to form a carboxylic acid salt. Products of acylation reactions between carboxylic acids or carboxylic anhydrides and amines can be produced from reacting a hydrophobic compound, containing carboxylic acid or carboxylic anhydride functionality, with a primary or secondary amine-containing compound through an acylation reaction to form an amide. Many carboxylic acid salts suitable for use an emulsifying agent are available commercially, such as sodium mono-oleate, or readily produced from an acid-base reaction between the corresponding carboxylic acid and sodium hydroxide or similar alkali hydroxide base. Methods for the synthesis of amide compounds are known in the art, including U.S. Pat. No. 3,219,666, which is hereby incorporated by reference. The hydrophobic compounds useful for reaction with amines include compounds containing, in addition to at least one hydrocarbyl group, one or more carboxylic acid groups and hydrophobic compounds that are derivatives of succinic acid, having two carboxylic acid groups, modified with at least one hydrocarbyl group.

The term "hydrocarbyl group" refers to a substituent having largely hydrocarbon character. In one embodiment of the invention, a hydrocarbyl group contains about 16 or more carbon atoms. In another embodiment, the hydrocarbyl group contains about 16 to about 32 carbon atoms. In yet another embodiment, the hydrocarbyl group contains about 32 to about 200 carbon atoms. In yet another embodiment, the hydrocarbyl group contains more than about 200 carbon atoms. In one embodiment of a hydrocarbyl group, the hydrocarbyl group contains no hetero atoms and can contain alkane, alkene, alkyne, cyclic, and/or aromatic functionalities. In another embodiment, the hydrocarbyl group contains no more than about three hetero atoms per 10 carbon atoms. In yet another embodiment, the hydrocarbyl group contains no more than about one hetero atom per 10 carbon atoms. In still yet another embodiment, the hydrocarbyl group contains a monounsaturated alkene functionality and can be oleic acid. Hydrocarbyl groups and compounds having a hydrocarbyl groups include compositions that are built up from smaller compound. For example, a compound containing from about 2 to about 4 carbon atoms can be reacted with an amine or sugar, and then the residue of that compound containing from about 2 to about 4 carbon atoms can be added to by polymerization or other chemical modification to have a total number of carbon atoms substantially congruent with the embodiments described above.

Examples of suitable primary and secondary amines are given by Formulae I and II, where R is a hydrocarbon group containing from about 1 to about 24 carbon atoms.

Specific examples of suitable primary or secondary amine-containing compounds include primary monoamines such as methylamine, ethylamine, propylamine, butylamine, octylamine, dodecylamine, and other primary amines containing from about 1 to about 24 carbon atoms. Examples of suitable secondary monoamines include diethylamine, dipropylaine dibutylamine, methylbutylamine, ethylhexylamine, and other secondary amines containing from about 1 to about 24 carbon atoms.

Further examples of suitable primary or secondary amines are given by the hydroxylamines of Formulae III and IV and the ether amines of Formulae V and VI, where R has the same meaning as above, R' is defined as either an R group or an R group substituted with one or more hydroxyl groups, and x is from about 2 about 15.

Still further, a suitable primary or secondary amines can be a polyamine as represented by Formula VII, where each R" group is independently either hydrogen, an R group, or an R group substituted by one or more hydroxyl or amino functionalities, and y is from about 2 to about 10.

The emulsifying agent can also be an alkyl-saccharide emulsifier, which is herein defined as an alkyl, acyl, ether, carbamide or amide derivatives of a saccharide, which can be a monosaccharide, polysaccharide, or oligosaccharide, formed from a reaction between a saccharide and a compound having a hydrocarbyl group, as described above, containing a carboxylic acid, alcohol and/or carbamate functionality to from an alkyl, ether, ester, carbamate or amide bond between the hydrocarbyl compound and the saccharide. In one embodiment, the alkyl-saccharide emulsifier contains a monosaccharide. In another embodiment, the alkyl-saccharide emulsifier contains a saccharide having from about 2 to about 6 saccharide residues. In yet another embodiment, the alkyl-saccharide emulsifier contains a saccharide having from about 7 to about 12 saccharide residues.

In one embodiment, the alkyl-saccharide emulsifier contains a monosaccharide or saccharide residue having from about 4 to about 8 carbon atoms. In another embodiment, the alkyl-saccharide emulsifier contains a monosaccharide or saccharide residue that is an aldose or a ketose sugar. In yet another embodiment, the alkyl-saccharide emulsifier contains a monosaccharide or saccharide residue that is a sugar alcohol such as sorbitol and/or the alkyl-saccharide emulsifier can be sorbitol mono-oleate. In still yet another embodiment, the alkyl-saccharide emulsifier contains a monosaccharide or saccharide residue that is a dehydration product or a sugar and/or sugar alcohol such as 1,4-sorbitan or isosorbide. In a further embodiment, the alkyl-saccharide emulsifier contains a monosaccharide or saccharide residue that is an amino sugar such as glucosamine. Specific illustrative examples of saccharides include fructose, glucose, galactose, erythrose, ribose, deoxyribose, xylose, mannose, sorbose, sorbitol, 1,4-sorbital, isosorbide, polysorbates, allose, mannoheptulose, octolose and stereoisomers thereof.

In one embodiment, the alkyl-saccharide emulsifier contains about one hydrocarbyl group. In another embodiment, the alkyl-saccharide emulsifier contain from about two to about three hydrocarbyl groups.

Many alkyl-saccharide emulsifiers are available commercially. In addition, methods of making saccharide-based emulsifiers having an alkyl, ether, ester, carbamate or amide bond between the hydrocarbyl compound and the saccharide are known in the art. WO 97/18243, which is hereby incorporated by reference, describes the synthesis of saccharide-based emulsifiers having an ester or amide bond between the hydrocarbyl compound and the saccharide. WO 03/031043, which is hereby incorporated by reference, describes the synthesis of saccharide-based emulsifiers having an amide or carbamate bond between the hydrocarbyl compound and the saccharide. U.S. Pat. Nos. 5,576,425 and 5,374,715, which are hereby incorporated by reference, describes the synthesis of saccharide-based emulsifiers having an ether-type bond between the hydrocarbyl compound and the saccharide.

In one embodiment, the explosive composition contains from about 2% to about 10% by weight of a fuel component. In another embodiment, the explosive composition contains from about 3.5% to about 8% by weight of a fuel component. The fuel component can be the organic phase of an emulsion. In one embodiment, the explosive composition contains from about 90% to about 98% by weight of an oxidizer component or an aqueous phase containing an oxidizer component. In another embodiment, the explosive composition contains from about 92% to about 96.5% by weight of an oxidizer component or an aqueous phase containing an oxidizer component. In one embodiment, the emulsifying agent in the explosive composition is from about 4% to about 50% of the total weight of the fuel component and/or the organic phase. In another embodiment, the emulsifying agent in the explosive composition is from about 12% to about 30% of the total weight of the fuel component or the organic phase. In yet another embodiment, the emulsifying agent in the explosive composition is from about 4% to about 5% of the total weight of the fuel component or the organic phase.

The explosive compositions and emulsions disclosed herein do not limit the invention but only serve to illustrate the breadth of explosive compositions and emulsions useful in the invention. The particular illustrations above represent suitable explosive compositions that may be efficiently used at a typical oil well site in view of availability of components, cost, and ability to generate $CO_2$ gas.

The above is not exhaustive of the emulsifying compounds useful for making suitable explosive compositions. U.S. Pat. Nos. 6,800,154; 3,447,981; 3,765,964; 3,985,593; 4,008,110; 4,097,316; 4,104,092; 4,218,272; 4,259,977; 4,357,184; 4,371,408; 4,391,659; 4,404,050; 4,409,044; 4,448,619; 4,453,989; 4,534,809; 4,710,248; 4,840,687; 4,956,028; 4,863,534; 4,822,433; 4,919,178; 4,919,179; 4,844,756; 4,844,756; 4,818,309; 4,708,753; 4,445,576; 4,999,062; International Patent Application Publication WO 96/28436; UK Patent Application GB 2,050,340A; and European Patent Application EP 561,600, all of which are incorporated herein by reference, contain teachings regarding suitable emulsifying compounds as well as teachings concerning methods of making explosive compositions including ratios of components and additives.

The combination of fuel and oxidizer is selected based on the stoichiometry of a combustion reaction between the fuel component and the oxidizer compounds forming $CO_2$ and water as the primary products. The amount of either component typically can vary up to about 15% from the amount dictated by stoichiometry; however, some embodiments can deviate further.

In one embodiment, an alkali or alkali earth carbonate is added to the explosive composition and mixed until homogeneity is achieved. Weight and percentages of fuel component, oxidizer component, and emulsifying agent referred to throughout this disclosure refer to weight and percentages of an explosive composition containing only the fuel component, oxidizer component, emulsifying agent and water included in the oxidizer/aqueous phase. Alkali or alkali earth carbonates and other additives, such as metallic oxidizers, can be added to the explosive composition by mixing. However, the discussion of weight and percentages of fuel component, oxidizer component, and emulsifying agent, above, is in reference to the mass of the explosive composition without such additional additives.

The alkali or alkali earth carbonate serves as an additional source of $CO_2$ gas. Alkali or alkali earth carbonate can decompose into $CO_2$ gas upon detonation of the explosive composition. Alkali and alkali earth carbonates include, but are not limited to, sodium carbonate (soda ash), calcium carbonate, potassium carbonate and magnesium carbonate. Sodium carbonate is particularly preferred. The alkali or alkali earth carbonate can be supplied as particulate material in the micro or nano size range. In one embodiment, the average diameter of alkali or alkali earth carbonate particles is about 100 µm or less. In another embodiment, the average diameter of alkali or alkali earth carbonate particles is from about 1 to about 100 µm. In yet another embodiment, the average diameter of alkali or alkali earth carbonate particles is from about 500 nm to about 1 µm. In yet another embodiment, the average diameter of alkali or alkali earth carbonate particles is from about 250 to about 500 nm. In still yet another embodiment, the average diameter of alkali or alkali earth carbonate particles is from about 400 nm to about 100 µm. In a further embodiment, the average diameter of alkali or alkali earth carbonate particles is about 500 nm or less. Throughout this disclosure, micro- or nano-sized particles refers particles having one of the preceding diameter size restrictions.

Alkali earth carbonates are practically insoluble in water at pH above about 6 and only sparingly soluble at pH from about 4 to about 6. Therefore, particulate alkali earth carbonate can be mixed into an explosive composition that is an emulsion with minimal loss of particulate material due to alkali or alkali earth carbonate dissolving in water. However, the aqueous phase of the emulsion can be buffered to a pH where carbonate is sparingly soluble or insoluble is needed.

In one embodiment, the alkali or alkali earth carbonate compound is added to the explosive composition such that the ratio of carbonate to other components is from about 1:10 to about 1:2 by weight. In another embodiment, the alkali or alkali earth carbonate compound is added to the explosive composition such that the ratio of carbonate to other components is from about 1:5 to about 2:5 by weight. In yet another embodiment, the alkali or alkali earth carbonate compound is added to the explosive composition such that the ratio of carbonate to other components is from about 1:5 to about 2:5 by weight.

Pressurization Through Reaction of Carbonate with an Acid

Referring to FIG. 1, the methods and apparatus of increasing oil well production will be discussed and described. In a typical geological formation, an oil reservoir 102 is located underneath a cap 104 of impervious rock that prevents petroleum from escaping to the surface. Formation of petroleum within the reservoir 102 displaces water such that a typical formation has a water layer 106 located below the less dense oil layer. A gas cap 108 can form above the oil reservoir 102 and below the cap 104, the gas cap can be in situ natural gas or other gasses evolved from the petroleum as petroleum is removed from the reservoir 102, or can be gas artificially introduced. In a typical formation, bed rock is located below the oil layer 102 and/or water layer 106.

A production oil well 110 is drilled from the surface, through the cap rock 104, and into a portion of the oil reservoir 102. As described above, a well may originally produce oil driven by natural pressure within the reservoir with enough pressure to force oil into a storage unit 112. Alternatively, the reservoir can contain enough pressure for the oil well 110 to produce efficiently, however, a pump 114 can also be provided to furnish enough energy for oil to complete the journey from the oil layer 102 to storage unit 112.

Oil production is increased through the combined use of the $CO_2$-releasing explosive composition and acidification of the water layer 106 and introduction of an alkali or alkali earth compound into the water layer 106. Components are introduced into the water layer through an injection well 120 drilled into the water layer 106. More than one injection well 120 can be formed to distribute injected components throughout the water layer 106.

In one aspect of the invention, alkali or alkali earth carbonate is injected through the injection well 120 into the water layer. The injection can be with or without pressure as needed. As discussed, alkali earth carbonates are at most only sparingly soluble at pH greater than about 4. Therefore, the alkali earth carbonate can be injected as an aqueous slurry. The aqueous portion of the slurry can be buffered to be slightly basic to prevent formation of $CO_2$ during introduction of slurry through well 120. In another embodiment, the alkali or alkali earth carbonate can be injected as an about saturated solution. In yet another embodiment, the alkali or alkali earth carbonate can be injected as a saturated solution in contact with micro-or nano-sized particles of alkali or alkali earth carbonate. In still yet another embodiment, the alkali or alkali earth carbonate is injected as an about 50% saturated or greater solution. Throughout all methods and innovations disclosed, solutions of acids and alkali or alkali earth carbonates injected into the petroleum reservoir can contain small amounts of corrosion inhibitors to protect metal contact surfaces. For example, RODINE® 213 cationic corrosion inhibitor solutions sold by Henkel Corporation can be used. RODINE® 213 is a cationic corrosion inhibitor solution containing substituted keto-amine-hydrochlorides and ethoxylated nonylphenols in a base of isopropyl alcohol, propargyl alcohol, methyl vinyl ketone, acetone, and acetophenone.

In one embodiment, the slurry of alkali or alkali earth carbonate contains from about 5 to about 35% by weight of alkali or alkali earth carbonate. In another embodiment, the slurry contains from about 10 to about 30% by weight of alkali or alkali earth carbonate. In yet another embodiment, the slurry contains about 15 to about 35% by weight of alkali or alkali earth carbonate.

The alkali or alkali earth carbonate injected into the water layer 106 is reacted with an acid to generate $CO_2$ gas. The acid and carbonate material are inject through separate injection wells 120 placed into the water layer 106. In one embodiment, the alkali or alkali earth carbonate is injected into the water layer before the acid is injected. In another embodiment, the acid is injected before the alkali or alkali earth carbonate is injected. In yet another embodiment, the alkali and alkali earth carbonate are injected simultaneously. Regardless of the order of addition of alkali or alkali earth carbonate, all wells drilled into the oil layer 102 or the water layer 106 must be sealed in a manner to substantially contain pressure build-up from the production of $CO_2$ gas. The acid can be a mineral acid including hydrochloric and sulfuric acid. The acid reacts with the alkali or alkali earth carbonate; the small size of the added carbonate assists in the reaction between alkali or alkali earth carbonate and acid to occur quickly and efficiently. An excess of acid is used to achieve acidification of the water layer 106, which reduces the amount of $CO_2$ that dissolves into water and becomes unavailable to contribute the pressure build-up caused by the generation of $CO_2$ within the reservoir.

As used throughout this disclosure, sealing of wells drilled into the oil layer 102 or the water layer 106 or sealing the reservoir to contain pressure is defined to mean sealing one or more of wells 120 and 122 in a manner that does not allow gas to escape. Not all wells 120 and 122 need to be physically sealed; only wells necessary to contain pressure within the reservoir need to be sealed. In particular, in an embodiment production well 110 can remain unsealed since any build-up of pressure within the reservoir results in the escape of oil from well 110 rather than the escape of gas. Sealing a well also includes attachment of a pump to any of wells 120 and 122 for the purpose of introducing any material into the oil 102 or aqueous 106 layers.

In one embodiment, the acid is a mineral acid and is added as solution that is about 5 to about 50% concentrated. In another embodiment, the acid is a mineral acid and is added as solution that is about 10 to about 40% concentrated. In yet another embodiment, the acid is a mineral acid and is added as solution that is about 20 to about 40% concentrated.

Where the alkali or alkali earth carbonate is added to the water layer 106 before the acid, the amount of acid addition can be adjusted to depend upon the pH of the water layer 106. The pH of the water layer 106 can be monitored through any well 120 that is remote from the well 120 through which acid is being added. Water can be either pumped out from the water layer 106 and the pH measured or a pH probe may be placed inside a remote well 120. In one embodiment, the amount of acid added is such that pH in the water layer is from about 4.5 to about 6.5. In another embodiment, the amount of acid added is such that pH in the water later is from about 5.5 to about 6.5. In another embodiment, the amount of acid added is such that pH in the water layer is from about 5.5 to about 6. In yet another embodiment, the amount of acid added is such that pH in the water layer is from about 4.5 to about 5.5.

Acidification of the water layer 106 decreases the fraction of $CO_2$ that dissolves in water in the form of carbonic acid. $CO_2$ that dissolves in the water layer 106 is unavailable to contribute to pressure increase within the reservoir. In one embodiment, from about 50 to about 100% of the carbon in the alkali or alkali earth carbonate is released as $CO_2$. In another embodiment, from about 60 to about 85% of the carbon in the alkali or alkali earth carbonate is released as $CO_2$. In yet another embodiment, from about 35 to about 85% of the carbon in the alkali or alkali earth carbonate is released as $CO_2$.

Those skilled in the art will readily understand that the fraction of alkali or alkali earth carbonate reacting with acid to form $CO_2$ gas and/or carbonic acid is ascertainable through use of pH measurement and the well-known Henderson-Hasselbalch equation, provided that the water layer 106 does not contain any significant buffering agents other than the alkali or alkali earth carbonate and enough time has elapsed for the reaction between acid and alkali or alkali earth carbonate to reach equilibrium. For example, the pH of the water layer is approximately 5.44 when 90% of the alkali or alkali earth carbonate reacts with two equivalents of acid based on a $pK_a$ of 6.4 for the bicarbonate ion. In any of the procedures or embodiments disclosed herein, the pH of the aqueous layer 106 can be periodically or continuously monitored to ascertain the concentration of acid in the aqueous layer 106.

Due to the large volume of a typical petroleum reservoir, a large time lag can occur between addition of acid and equilibration of the reaction with the alkali or alkali earth carbonate. Further, the acid can be added to the water layer 106 before addition of the alkali or alkali earth carbonate or simultaneous with the addition of alkali or alkali earth carbonate. Therefore, a predetermined amount of acid can be added to the water layer 106. The quantity in moles of alkali or alkali earth carbonate added to the water layer 106 can be readily determined from the weight of alkali or alkali earth carbonate added and the molecular weight of that carbonate. Similarly, the equivalents of acid added can easily be determined by the mass and molecular weight of acid added to the water layer 106. Hydrochloric acid contains one mole equivalent of acid per mole while sulfuric acid contains two equivalents of acid per mole. In one embodiment, from about 1.5 to about 2 equivalent of acid is added per mole of alkali or alkali earth carbonate. In another embodiment, from about 1 to about 2 equivalents of acid is added per mole of alkali or alkali earth carbonate. In yet another embodiment, from about 0.5 to about 1 equivalents of acid is added per mole of alkali or alkali earth carbonate.

In one embodiment, wells 120 and 122 used to introduce materials into the aqueous layer 106 and oil layer 102, respectively, are positioned in a manner to minimize the average distance between the wells 120 and 122 and production wells 110. This can be achieved by placement of wells 120 and 122 in the middle of a group of production wells 110. That is, wells 120 and 122 can be position closer to the center of a reservoir relative to production well or wells 110. In one embodiment, a reservoir has from about 1 to about 10 production wells 110 within a distance of about 5 km from either a well 120 or a well 122. In another embodiment, a reservoir has from about 1 to about 10 production wells 110 within a distance of about 1 km from either a well 120 or a well 122.

Pressurization Through Reaction of Carbonate with an Acid in the Presence of Hard Water In some regions, the water layer 106 can contain significant amounts of divalent cations including $Ca^{2+}$ and/or $Mg^{2+}$. Carbonate ions have a propensity to than a sparingly soluble precipitates in the presence of $Ca^{2+}$ and/or $Mg^{2+}$. As discussed, carbonate can be added to water layer 106 is the form of an alkali earth carbonate particulate material in the micro- or nano-size range to avoid the formation of blockages within the water layer 106. When carbonate is supplied as soluble alkali carbonate in solution, such as sodium carbonate, there is a risk of carbonate forming large precipitates due to reaction with $Ca^{2+}$ and/or $Mg^{2+}$, which can impair the flow of materials through the aqueous layer 106 and the porous rock oil layer 102 leading to reduced oil recovery.

To reduce the instances of precipitates forming due to the presence of $Ca^{2+}$ and/or $Mg^{2+}$ ions, a modified procedure of adding carbonate and acid to generate $CO_2$ gas can be employed. In one embodiment, acid is injected into the aqueous layer 106 through an injection well 120, as described above, to acidify the aqueous layer 106. Second, acid and a carbonate-containing solution or slurry is injected into the aqueous layer 106 through separate injection wells 120. That is, an acid is injected into the aqueous layer 106 through a first injection well 106, and a carbonate-containing solution or slurry is injected into a second injection well 120, simultaneously. Acidification of aqueous layer 106 prior to the introduction of carbonate allows for the carbonate to react with the acid before it is possible for a $Ca^{2+}$- and/or $Mg^{2+}$-containing precipitate to form. Addition of acid concurrent with the addition of carbonate allows for the acidity of the water layer 106 to be maintained over the course of carbonate addition. The amount of carbonate-containing solution or slurry injected into a second injection well 120 and the amount of acid injected into the aqueous layer 106 through a first injection well can be stoichiometrically matched such that the pH of aqueous layer 106, and therefore the rate of $CO_2$, does not vary drastically. That is, once the aqueous layer 106 was adjusted to become acidic, in order to maintain the acidic condition without frequent adjustments, both carbonate solution or slurry and acid solution can be introduced continuously using two separate pumps through two separate injection wells 120 while the reservoir is sealed to prevent the loss of pressure developed by $CO_2$ gas. In one embodiment, the acid solution and the carbonate solution or slurry is added at a mole ratio of 2:1, such that two equivalents of acid are provided to neutralize one equivalent of carbonate. The pH of the aqueous layer 106 can be continuously or periodically monitored to determine if the aqueous layer 106 has sufficient acidity to react with carbonate without producing an excessive amount of precipitate.

In another embodiment, the hardness of the aqueous layer 106 (concentration of $Ca^{2+}$ and/or $Mg^{2+}$ ions) is measured using known techniques. Acid is injected into the aqueous layer 106 through an injection well 120, as described above, to acidify the aqueous layer 106 such that the molar concentration of acid equivalents (concentration of $H^+$ ions) in the aqueous layer is about two times or more concentrated than the molar concentration of $Ca^{2+}$- and/or $Mg^{2+}$ ions. In an alternate embodiment, acid is introduced to the aqueous layer 106 such that the concentration of acid equivalents in the aqueous layer 106 is about five time or more than the molar concentration of $Ca^{2+}$ and/or $Mg^{2+}$ ions. After acidification of the aqueous layer 106, a carbonate-containing solution or slurry is injected into a second injection well 120. The amount of carbonate-containing solution or slurry injected is a mole amount that is less than the mole amount of acid equivalent introduced into the well such that the acidity of the aqueous layer is never completely neutralized.

Generally, acid will react will carbonate at a faster rate than of $Ca^{2+}$ and/or $Mg^{2+}$ ions. In another alternate embodiment, the amount of carbonate-containing solution or slurry injected is a mole amount that is less than about half the mole amount of acid equivalents introduced to the aqueous layer 106. In still another alternate embodiment, the amount of carbonate-containing solution or slurry injected is a mole amount that is less than about a fourth of the mole amount of acid equivalents introduced to the aqueous layer 106. Those skilled in the art will readily recognize that $Ca^{2+}$ and/or $Mg^{2+}$ ions react with carbonate by 1:1 stoichiometry to form a precipitate, while two mole equivalents of acid is need to react with carbonate to form $CO_2$. Therefore in an embodiment, the mole equivalents of acid introduced into aqueous layer 106 is about twice or more than the mole equivalents of carbonate introduced into aqueous layer 106. The addition of acid followed by the introduction of $CO_2$ can be repeated in an iterative process to generate sufficient $CO_2$ pressure. The pH of the aqueous layer 106 can be continuously or periodically monitored to determine if the aqueous layer 106 has sufficient acidity to react with carbonate without producing an excessive amount of precipitate.

Any water used to prepare the acid and/or the carbonate-containing solution or slurry can be treated to remove $Ca^+$- and/or $Mg^{2+}$ ions through the use of cation exchanged resins, distillation, or other well-known techniques to deionize water prior to use.

Pressurization Through Use of an Explosive Composition

The explosive composition comprising fuel and oxidant is injected through one or more injection wells 122 drilled into the oil layer of the reservoir 102. The explosive composition must be delivered into the oil layer 102 or directly onto the oil layer 102. Alternatively, the explosive composition can be introduced into one or more production wells 110. The explosive composition must be placed as to maintain contact with a primer and a detonator. The primer can be any material commonly used to detonate explosives including mercury fulminate, sodium azide, lead azide, lead styphnate, or tetryl. The detonator can be an electrical detonator.

The water layer 106 is acidified to minimize loss of $CO_2$ gas through dissolution in the water layer 106. In one embodiment, the water layer 106 is acidified before addition of the explosive composition to the oil layer 102. In another embodiment, the water layer 106 is acidified after addition of the explosive composition to the oil layer 102. In yet another embodiment, the water layer 106 is acidified simultaneously to the addition of the explosive composition to the oil layer 102.

In one embodiment, the water layer 106 is acidified to a pH from about 5 to about 6. In another embodiment, the water layer 106 is acidified to a pH from about 4.5 to about 5.5. In yet another embodiment, the water layer 106 is acidified to a pH from about 3.5 to about 4.5.

In one embodiment, the explosive composition is detonated after the addition of acid is completed. In another embodiment, the explosive composition can be detonated before the addition of acid is begun or completed. Care must be taken that the explosive blast is not so strong as to damage sensitive equipment at the site, to damage or cause the collapse of any of the drilled well 120 and 122, or to adversely affect the subjacent support of the surface terrain. In one embodiment, the magnitude of the explosive blast is the equivalent energy from about 0.05 to about 2 metric tons of trinitrotoluene (TNT). In another embodiment, the magnitude of the explosive blast is the equivalent energy from about 0.1 to about 1 metric ton of TNT. In yet another embodiment, the magnitude of the explosive blast is the equivalent energy from about 0.25 to about 1.5 metric tons of TNT. In addition to serving as a source of $CO_2$ gas, alkali or alkali earth carbonate mixed into the explosive composition has the additional effect of slowing down the explosion and cooling the temperature of the explosion as to not damage the petroleum reservoir formation.

A single explosive detonation can potentially not be sufficient to create satisfactory oil production. During both the addition of acid and detonation of the explosive composition, pressure or rate of oil production can be monitored at any well drilled to the oil layer 102. If a satisfactory pressure or rate of oil production is not obtained from a first detonation of the explosive composition, the acts of adding explosive to the oil layer 102, detonation of the oil layer, and monitoring the pressure or rate of oil production can be iteratively repeated until a satisfactory result is obtained.

$CO_2$ gas is created through two events utilizing the innovations disclosed herein. In the first source, $CO_2$ gas is created by the reaction between the alkali or alkali earth carbonate and the acid added to the water layer 106. In the second source, $CO_2$ gas is created by the detonation of the explosion through combustion and/or through heat causing the breakdown of carbonate. The sources of $CO_2$ gas are referred to as acid generation and explosive generation, respectively. $CO_2$ can be generated through acid generation, through explosive generation, or through both modes of $CO_2$ production. Where both acid generation and explosive generation are employed, the fraction of $CO_2$ originating from either the acid generation method or the explosive generation method can be modified by varying the amount of explosive composition relative to alkali or alkali earth carbonate injected into the water layer 106 throughout all acts of the methods disclosed herein. In one embodiment, the ratio of the weight of carbon contained in the explosive composition to the weight of carbon contained in the alkali or alkali earth carbonate is about 0.4 to about 0.6. In another embodiment, the ratio of the weight of carbon contained in the explosive composition to the weight of carbon contained in the alkali or alkali earth carbonate is about 0.2 to about 0.8. In yet another embodiment, the ratio of the weight of carbon contained in the explosive composition to the weight of carbon contained in the alkali or alkali earth carbonate is about 0.05 to about 0.95.

Supplemental Methods

The methods disclosed herein can be combined with other techniques for the increased production from a reservoir. For example, the disclosed methods are directed toward increasing the pressure within a reservoir through the production of $CO_2$ gas. These methods can be combined without other strategies for increasing oil production including lowering of the viscosity of oil within the reservoir. In one embodiment, the viscosity of oil in the vicinity of a production well 110 is decreased in order to increase the rate of production from that production well 110.

Figure 2:
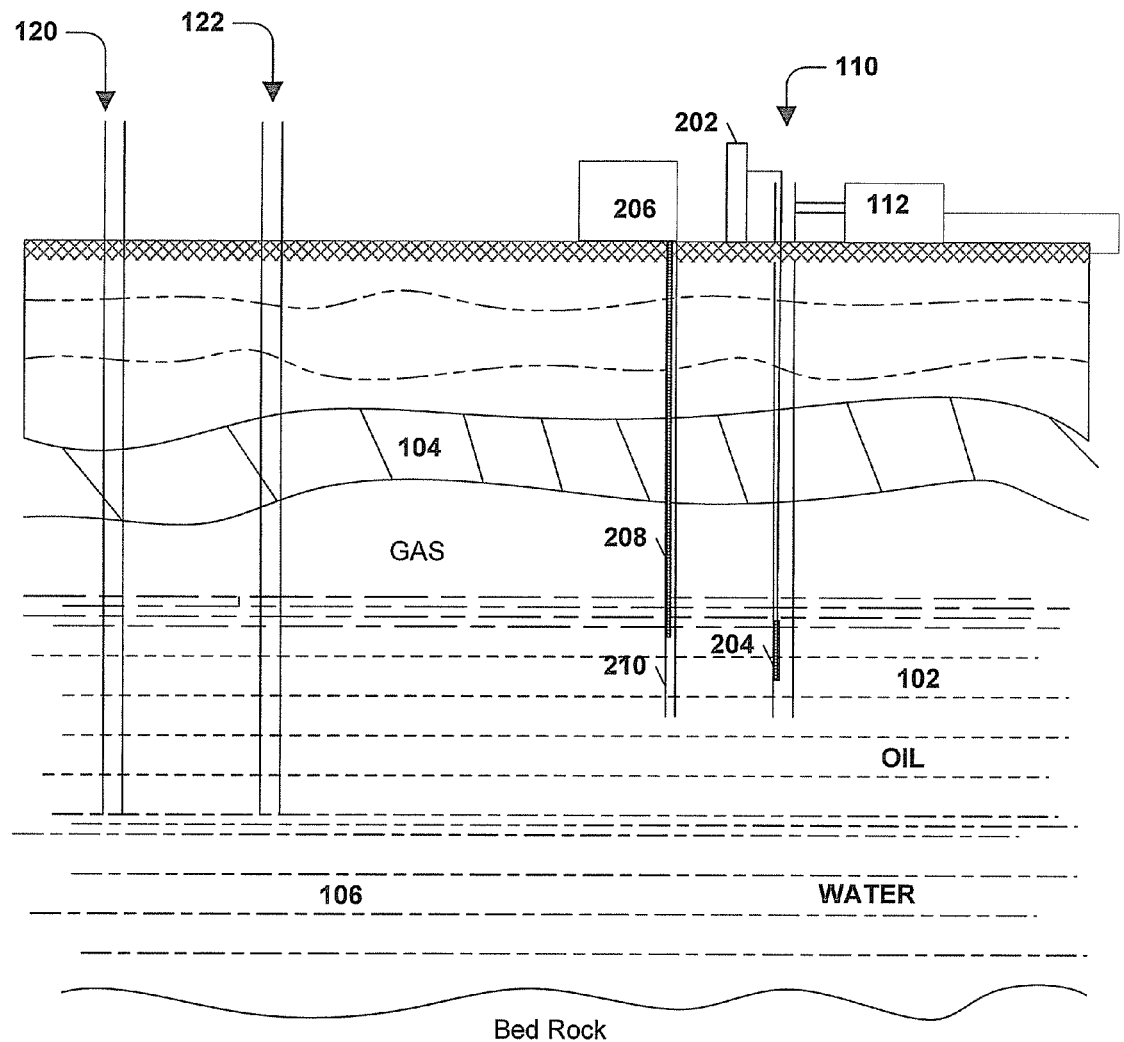
FIG. 2 is a representation of a subterranean petroleum reservoir with wells placed therein and depicting supplemental recovery methods in accordance with aspects of the invention.

One method for decreasing the viscosity of oil is sonication. As shown in FIG. 2, a sonication generator 202 can be provided with an attached probe sonicator 204 that can be lowered into a production well 110 to be in contact with oil therein. The size of the probe sonicator is such that the bore hole of production well 110 has sufficient diameter to accommodate the probe sonicator without impeding flow of petroleum from the production well 110. Acoustic energy from the probe sonicator can serve to break up any aggregates impeding oil flow near the production well 110 as well as generating heat to reduce viscosity. Sonication methods can be advantageous in many situations including extraction of heavy crude and extraction from tar sands. As such, sonication in conjunction with $CO_2$ gas generation can enhance oil recovery.

Further, thermal methods can be used to decrease oil viscosity by increasing the temperature of oil neat a production well 110. An increase in temperature can also be achieved using microwave techniques. For example as shown in FIG. 2, a microwave generator 206 and a microwave waveguide 208 can be introduced into a service bore hole 210 or into the production well 110 to deliver microwave energy to heat oil in the vicinity of the production well 110. In one embodiment, the waveguide transmits in the traverse magnetic (TM) mode. In one embodiment, the waveguide is a hollow waveguide made out of a conducting material such as metal. In another embodiment, the waveguide is a hollow waveguide made out of a conductive material and filled with a dielectric substance.

In order to fully describe the innovations disclosed herein, acts for performing the inventive method by reaction of acid with alkali or alkali earth carbonate are described by reference to FIG. 2. In act 302, at least one suitable production well drilled into the oil layer of a subterranean petroleum reservoir. In act 304, an alkali or alkali earth carbonate and/or an acid is injected into the water layer. In act 306, the petroleum reservoir sealed in a manner to substantially contain $CO_2$ pressure throughout the performance of all downstream acts. In act 208, the remaining acts from act 304 are performed if not already executed, at least one injection well drilled into the water layer are identified or formed. In act 310, the seal on the petroleum reservoir is sustained in a manner such that oil can be recovered from a production well. In act 312, microwave radiation or acoustic energy from a sonication probe is optionally introduced into the petroleum reservoir to reduce the viscosity of the oil within the reservoir. When there is a significant level of $Ca^{2+}$ and/or $Mg^{2+}$ ions in an aqueous layer associated with the petroleum reservoir, injection of acid to the aqueous layer can be performed before addition of the carbonate to minimize precipitates.

Figure 3:
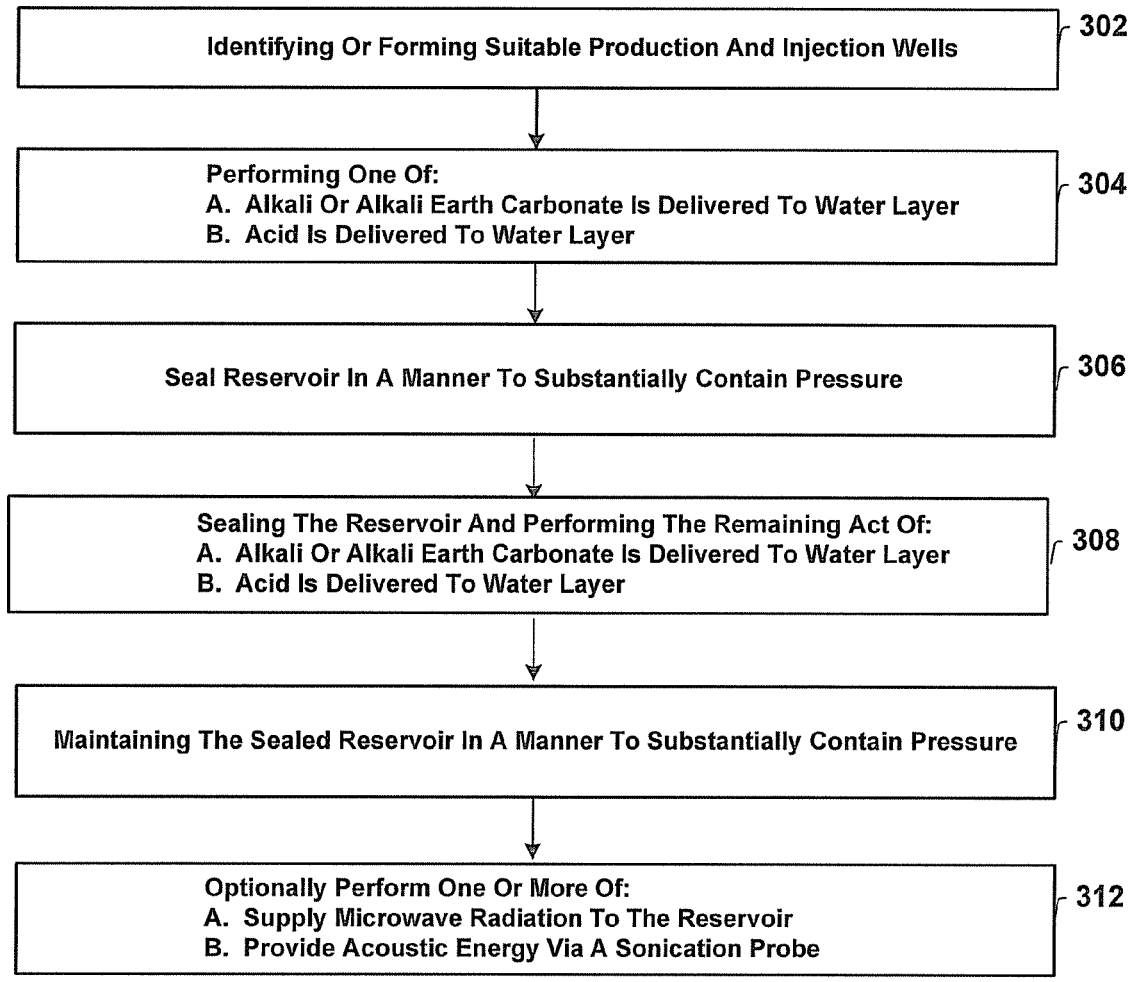
FIG. 3 is a flow chart of illustrative acts of methods for increasing petroleum production in accordance with aspects of the invention.

In order to fully describe the innovations disclosed herein, acts for performing the inventive method by detonating an explosive composition are described by reference to FIG. 3. In act 402, at least one suitable production well drilled into the oil layer of a subterranean petroleum reservoir and at least one injection well drilled into the water layer are identified or formed. Additional injection and/or production wells drilled into either the oil layer or the water layer are typically provided. In act 404, the wells drilled into the petroleum reservoir are sealed in a manner to substantially contain pressure. Then, an explosive composition is delivered/injected into the oil layer of a petroleum reservoir and/or the water layer associated with the petroleum reservoir is acidified with acid. In act 406, the seal to substantially contain pressure within the reservoir is maintained to contain $CO_2$ pressure throughout the performance of all downstream acts. In act 408, the remaining acts from act 404 are performed if not already executed. In act 410, the explosive composition is detonated, and the pressure within the petroleum reservoir is monitored and/or the rate of oil production is monitored. In act 412, microwave radiation or acoustic energy from a sonication probe is optionally introduced into the petroleum reservoir to reduce the viscosity of the oil within the reservoir. In act 414, acts of delivering additional explosive composition, detonating the explosive composition, and monitoring pressure/production are repeated, if necessary.

Figure 4:
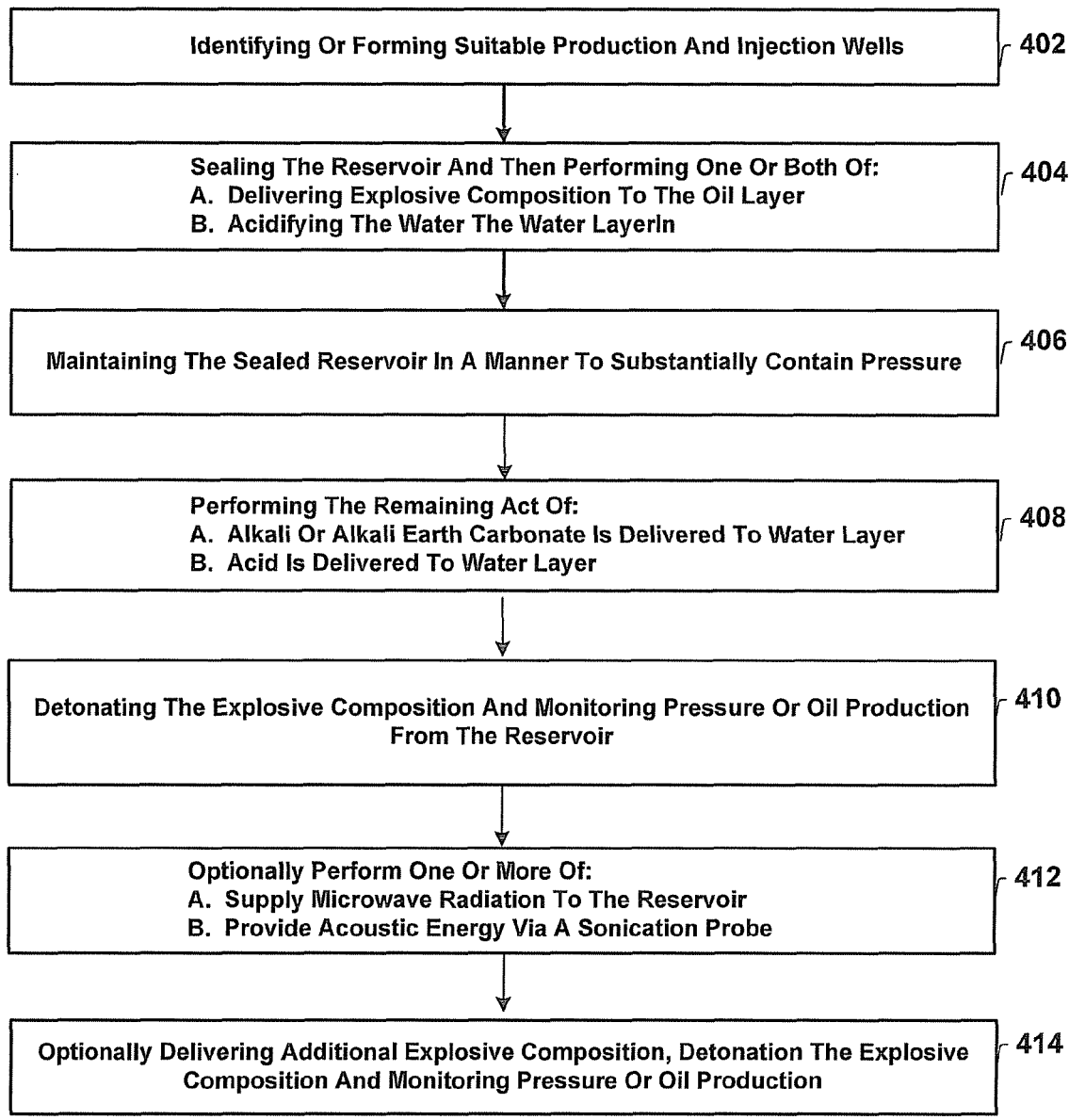
FIG. 4 is a flow chart of illustrative acts of methods for increasing petroleum production in accordance with aspects of the invention.

Those having skill in the art will readily recognize that the above steps are only illustrative of the inventive methods disclosed herein. When the acts shown in FIGS. 3 and 4 are both performed on the same petroleum reservoir, the order of act shown in FIGS. 3 and 4 can be performed in any suitable order to achieve artificial $CO_2$ gas production. For example, an explosive composition can be introduced into the oil layer and detonated before or after any alkali or alkali earth carbonate compound is added to the water layer. Those having skill in the art can readily identify a sequence of acts that lead to successful $CO_2$ gas production. The inventive methods are not limited to a specific sequence of acts.

With respect to any figure or numerical range for a given characteristic, a figure or a parameter from one range may be combined with another figure or a parameter from a different range for the same characteristic to generate a numerical range. Other than in the operating examples, or where otherwise indicated, all numbers, values and/or expressions referring to quantities of ingredients, reaction conditions, etc., used in the specification and claims are to be understood as modified in all instances by the term "about."

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method to increase petroleum production from an oil well drilled into a petroleum reservoir having an oil layer and an aqueous layer having one or more of $Ca^{2+}$ and $Mg^{2+}$ ions present, comprising:
    delivering an acid into the aqueous layer through one or more injection wells drilled into the aqueous layer;
    delivering one or more of an alkali carbonate or an alkali earth carbonate into the aqueous layer through one or more injection wells drilled into the aqueous layer; and
    sealing the oil well in a manner to substantially confine an increase in pressure within the petroleum reservoir,
    wherein delivering the acid into the aqueous later is performed before the one or more alkali carbonate or alkali earth carbonate into the aqueous layer, and
    the amount of acid delivered is such that the molar concentration of $H^+$ ions in the aqueous layer is about two times or more concentrated than the sum of the molar concentrations of $Ca^{2+}$ and $Mg^{2+}$ ions present in the aqueous layer.

2. The method of claim 1, wherein an alkali carbonate is delivered to the aqueous layer.

3. The method of claim 2, wherein the alkali carbonate is sodium carbonate.

4. The method of claim 1, wherein the mole amount of the one or more alkali carbonate and alkali earth carbonate is less than half the mole amount of acid equivalents introduced to the aqueous layer.

5. The method of claim 1, wherein delivering the one or more of an alkali carbonate or an alkali earth carbonate into the aqueous layer is done through a first injection well drilled into the aqueous layer and delivering the acid into the aqueous layer is done through a second injection well drilled into the aqueous layer; and wherein at least one delivery of the acid into the aqueous later is performed before the one or more alkali carbonate or alkali earth carbonate is delivered into the aqueous layer, and wherein at least one delivery of the acid into the aqueous later is performed simultaneous to the delivery of one or more alkali carbonate or alkali earth carbonate into the aqueous layer.

6. The method of claim 1, wherein the one or more of alkali carbonate or alkali earth carbonate is supplied as particles having an average diameter of about 100 μm or less.

7. The method of claim 1, wherein the alkali or alkali earth carbonate is delivered as one or more of an aqueous solution about 50% or more concentrated and a slurry having about 5 to about 35% by weight of alkali or alkali earth carbonate.

8. The method of claim 1, wherein the alkali or alkali earth carbonate is one or more of sodium carbonate, calcium carbonate, potassium carbonate and magnesium carbonate.

9. The method of claim 1, where the acid is a mineral acid and the mineral acid comprises a solution that is from about 10 to about 50% concentrated.

10. The method of claim 9, wherein the mineral acid is hydrochloric acid.

11. A method to increase petroleum production from an oil well drilled into a petroleum reservoir having an oil layer and a water layer, wherein at least one selected from one or more injection wells and one or more production wells are drilled into the oil layer and one or more injection wells are drilled into the water layer, comprising:
    delivering an explosive composition capable of generating $CO_2$ gas and heat into at least one selected from the one or more injection wells and the one or more production wells drilled into the oil layer;

delivering an acid through one or more injection wells drilled into the aqueous layer to acidify the aqueous layer;

sealing the petroleum reservoir in a manner to confine pressure build-up within the petroleum reservoir;

detonating the explosive composition; and one or more selected from:

introducing a sonication probe into at least one of the one or more production well such that the sonication probe is capable of delivering acoustic energy to petroleum within the reservoir to lower the viscosity of the petroleum, and introducing microwave radiation into at least one of the one or more production wells such that the microwave radiation is at least partially absorbed by petroleum with the reservoir to lower the viscosity of the petroleum, wherein the explosive composition comprises a fuel component and an oxidizer component, the fuel component is one or more of a carbon powder and a hydrocarbon-based compound.

12. The method of claim 11, wherein the hydrocarbon-based compound comprises unrefined crude oil.

13. The method of claim 12, wherein the explosive composition further comprises an emulsifying agent and one or more alkali carbonate or alkali earth carbonate.

14. The method of claim 13, wherein the explosive composition comprises from about 2% to about 10% by weight of the fuel component; from about 90% to about 98% by weight of the oxidizer component; and the emulsifying agent is from about 4% to about 50% of the total weight of the fuel component; and the ratio of alkali or alkali earth carbonate to other components is from about 1:10 to about 1:2 by weight.

15. The method of claim 13, wherein the alkali or alkali earth carbonate is one or more of sodium carbonate, calcium carbonate, potassium carbonate and magnesium carbonate.

16. The method of claim 13, wherein the emulsifying agent comprises one or more of:
a) a salt of a compound having at least one hydrocarbyl group and at least one carboxylic acid functionality;
b) an alkyl-saccharide emulsifier;
c) sorbitol mono-oleate;
d) sodium mono-oleate; and
e) the product of an acylation reaction between a hydrocarbyl group-containing carboxylic acid or carboxylic anhydride and a primary or secondary amine, wherein the primary or secondary amine is one or more selected from Formulae I, II, III, IV, V, VI, and VII:

$$H_2N-R \quad (I);$$

$$R-NH-R \quad (II);$$

$$H_2N-R-OH \quad (III);$$

$$R'-NH-R-OH \quad (IV);$$

$$H_2N-(RO)_x-H \quad (V);$$

$$R'-NH(RO)_x-H \quad (VI); \text{ and}$$

$$R''NH-((CH_2)_yN)-R_2'' \quad (VII);$$

where R is a hydrocarbon group containing from about 1 to about 24 carbon atoms, R' is independently either an R group or an R group substituted with one or more hydroxyl groups, R" is independently either hydrogen, an R group, or an R group substituted by one or more hydroxyl or amino functionalities, x is from about 2 about 15, and y is from about 2 to about 10.

17. The method of claim 12, wherein the one or more of alkali carbonate or alkali earth carbonate is supplied as one or more of an aqueous solution about 50% or more concentrated and particles having an average diameter of about 100 μm or less.

18. A method to increase petroleum production from an oil well drilled into a petroleum reservoir having an oil layer and an aqueous layer having one or more of $Ca^{2+}$ and $Mg^{2+}$ ions present, comprising:

delivering an acid into the aqueous layer through one or more injection wells drilled into the aqueous layer;

delivering one or more of an alkali carbonate or an alkali earth carbonate into the aqueous layer through one or more injection wells drilled into the aqueous layer;

sealing the oil well in a manner to substantially confine an increase in pressure within the petroleum reservoir, wherein delivering the acid into the aqueous later is performed before the one or more alkali carbonate or alkali earth carbonate into the aqueous layer, and the amount of acid delivered is such that the molar concentration of $H^+$ ions in the aqueous layer is about two times or more concentrated than the sum of the molar concentrations of $Ca^{2+}$ and $Mg^{2+}$ ions present in the aqueous layer; and one or more selected from:

introducing a sonication probe into at least one of the one or more production well such that the sonication probe is capable of delivering acoustic energy to petroleum within the reservoir to lower the viscosity of the petroleum, and introducing microwave radiation into at least one of the one or more production wells such that the microwave radiation is at least partially absorbed by petroleum with the reservoir to lower the viscosity of the petroleum.

19. The method of claim 18, wherein the one or more of alkali carbonate or alkali earth carbonate is supplied as one or more of an aqueous solution about 50% or more concentrated and particles having an average diameter of about 100 μm or less.

20. The method of claim 18, wherein the explosive energy created by detonation of the explosion composition is from about 0.05 to about 2 metric tons of trinitrotoluene.

21. The method of claim 18, wherein delivering the one or more of an alkali carbonate or an alkali earth carbonate into the aqueous layer is done through a first injection well drilled into the aqueous layer and delivering the acid into the aqueous layer is done through a second injection well drilled into the aqueous layer; and wherein at least one delivery of the acid into the aqueous later is performed before the one or more alkali carbonate or alkali earth carbonate is delivered into the aqueous layer, and wherein at least one delivery of the acid into the aqueous later is performed simultaneous to the delivery of one or more alkali carbonate or alkali earth carbonate into the aqueous layer.

* * * * *